May 20, 1941.    W. D. FOSTER ET AL    2,243,048
CONTROL METHOD AND MECHANISM FOR PHOTOGRAPHIC PRINTERS
Original Filed Sept. 24, 1934    2 Sheets-Sheet 1
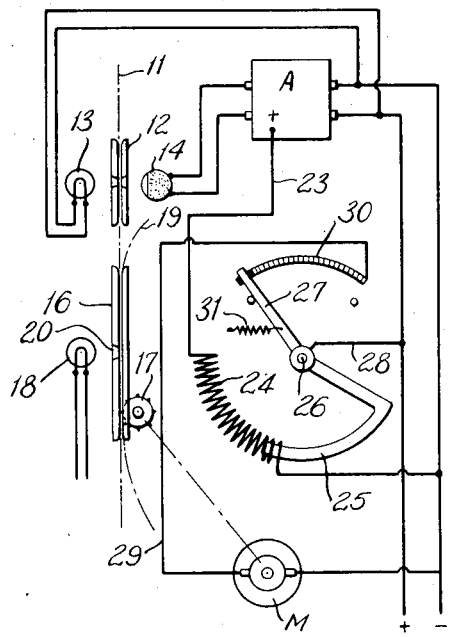
*Fig. 1*
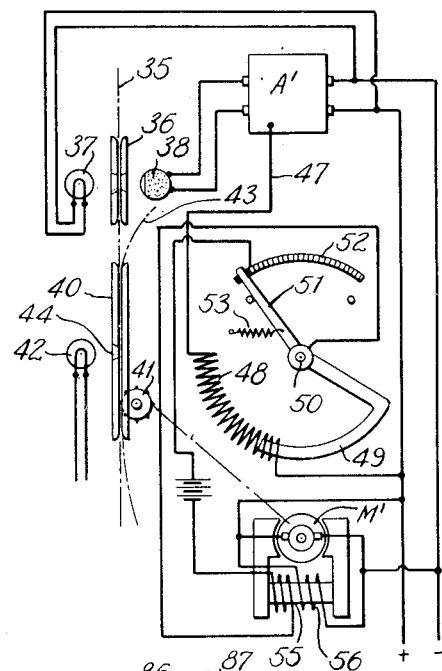
*Fig. 2*
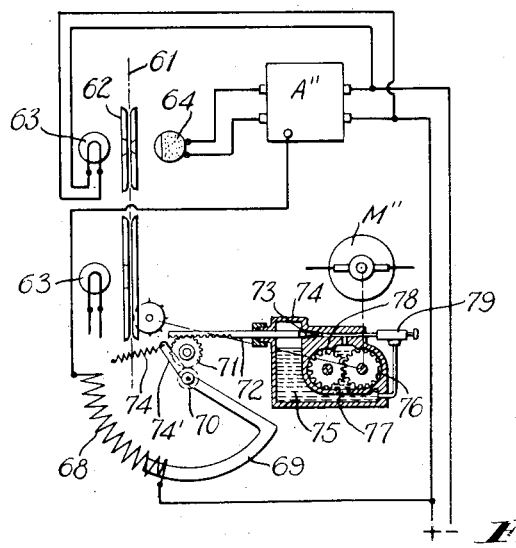
*Fig. 3*
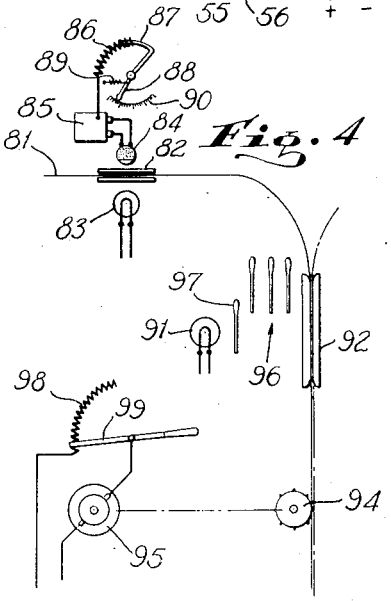
*Fig. 4*
*Fig. 4A*
INVENTOR
WARREN DUNHAM FOSTER & EARLE L. PARMELEE,
DECEASED, BY PEOPLES-PITTSBURG TRUST
COMPANY, EXECUTOR.
By Warren D. Foster
ATTORNEY May 20, 1941.  W. D. FOSTER ET AL  2,243,048
CONTROL METHOD AND MECHANISM FOR PHOTOGRAPHIC PRINTERS
Original Filed Sept. 24, 1934   2 Sheets-Sheet 2
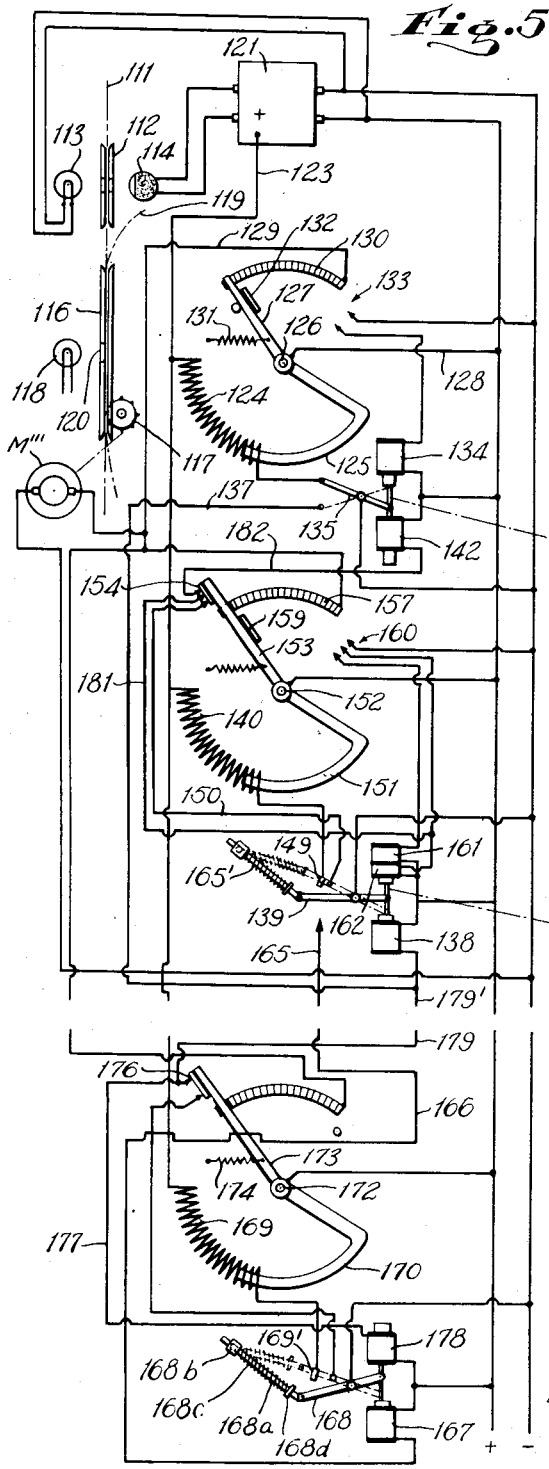
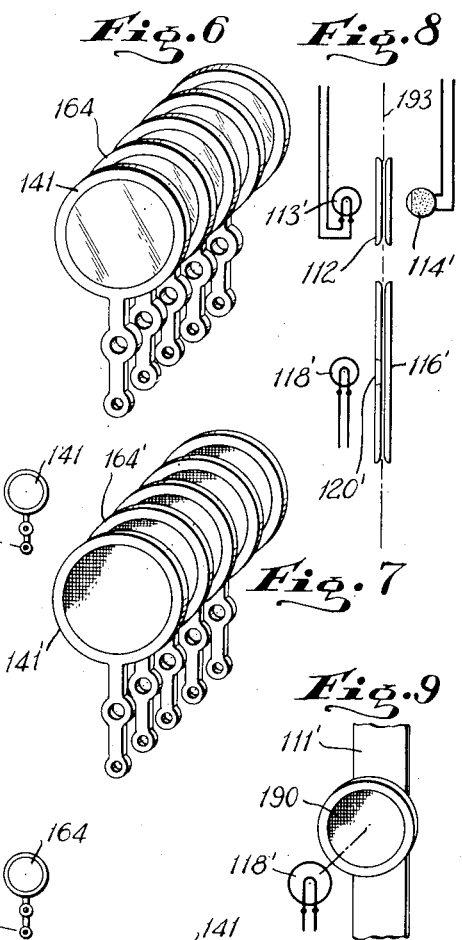
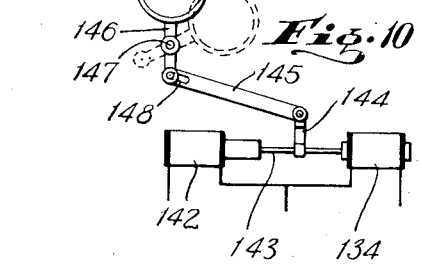
INVENTOR
WARREN DUNHAM FOSTER and EARLE L. PARMELEE,
DECEASED, BY PEOPLES-PITTSBURGH TRUST COMPANY,
EXECUTOR.
By Warren D. Foster
ATTORNEY Patented May 20, 1941

2,243,048

UNITED STATES PATENT OFFICE 2,243,048

CONTROL METHOD AND MECHANISM FOR PHOTOGRAPHIC PRINTERS

Warren Dunham Foster, Washington Township, Bergen County, N. J., and Earle L. Parmelee, deceased, late of Pittsburgh, Pa., by Peoples-Pittsburgh Trust Company, executor, Pittsburgh, Pa., assignors, by direct and mesne assignments, to Kinatome Patents Corporation, Ridgewood, N. J., a corporation of New York Original application September 24, 1934, Serial No. 745,320. Divided and this application September 24, 1934, Serial No. 745,321

19 Claims. (Cl. 95—75)

This application is a division of our application Serial Number 745,320, filed concurrently herewith. Our immediately parent application is a continuation in part of our application Serial Number 706,437, filed January 12, 1934, now Patent No. 2,213,212, which in turn is a division of our application Serial Number 105,159, filed April 28, 1926, which on January 16, 1934, matured as Patent Number 1,944,024. In all of said applications we describe and claim means operated by light passed through a film for controlling in the particular manner desired various operations of the film handling apparatus itself and operations of apparatus associated therewith. In our said application, Serial Number 706,437, we describe and claim apparatus in which the speed of operation of the film feeding mechanism is determined by such light-responsive signals as is also the amount of light which is effective upon the film.

In our earlier filed application, we control the apparatus by means of changes in the translucency of successive portions of the moving film. A light beam, modified by such successive portions, operates a control mechanism. In the immediately parent application, we apply our invention specifically to a printing apparatus, and describe and claim such changes as caused by signalling portions applied to the film or by the density of the film itself.

As is well understood in the motion picture art, in producing a positive film from a negative film or in reversing a negative film into a positive film, it is necessary to modify the effectiveness of the printing light in accordance with changes in the density of the successive portions of the negative so that the resulting positive will be of uniform density. In preferred forms of our present invention, we accomplish such modification by means controlled by the film itself. As taught in our immediately parent application, we may exercise this control in various ways, as preferably by introducing resistance into the circuit of the light source or alternatively by maintaining the light source constant and varying the effectiveness of the light impinging upon the film by changing the speed of movement of the film through the light beam, thereby varying the exposure. In order to avoid the difficulties attended upon too great variations in speed, we may use such variations to determine the minor and delicate changes in intensity and rely upon screens or other light-retarding instrumentalities, automatically interposed in the light beam, to accomplish the major variations. Alternatively, we may accomplish such minor variations by changes in the resistance in circuit with the printing light while using screens for the major variations. By such methods, we are able to limit the use of resistance in the circuit of the light source to such small amounts as will cause no change in color values and hence in printing effectiveness and secure full range of gradation of light values by such secondary means.

In this divisional application, we claim our invention as applied to the control of a printing operation by method and/or means which do not depend upon any change in source which produces the beam of a printing light but depend upon varying the speed at which a film is moved through a beam of light from an unchanging source. Such method and means, if desired, may include the supplemental use of light-retarding means to secure the larger gradations, while we depend upon speed changes for the minor variations.

Among the further objects of our invention are the provision of improved means for:

1. Controlling the placing of resistance in circuit with the motor of a film handling apparatus and its removal therefrom;
2. Operating a light modifying means;
3. Operating means for modifying light from a constant source;
4. Controlling the speed of film movement by a fluid operated brake applied to the driving mechanism;
5. Controlling the speed of film movement by applying a braking force to the driving motor preferably by the introduction of resistance into the field of a motor.

We also provide method and/or means whereby the light changes in a printing operation may be in part automatic and in part under the control of an operator.

A most important object of our invention is to provide an automatic printing or reversal machine in which the film itself controls the entire operation either through signals placed upon it or alternatively through the density of the negative itself in combination with means responsive to radiant energy.

Throughout this specification we refer to photographic printing and to the reversal of a photographic negative into a positive. So far as our invention is concerned, the two operations may be considered as interchangeable. Our invention can be applied in some of its phases to either step printing or continuous printing.

It has been proposed to change the effectiveness of a light beam impinging upon a film by means of the movement of a shutter or a diaphragm operated by mechanism which is actuated by a photo-electric cell or similar instrumentality. Such a construction necessitates the rapid movement of a relatively large mass of material for very short distances in order to give the fine gradations which are necessary in a printing operation. An important object of the present invention is to improve upon such mechanism either by eliminating screens or shutters entirely and depending upon resistance in circuit with the motor or upon other means of changing motor speed, and alternatively upon such means to accomplish the finer gradations and the movement of screens or the like to and from predetermined positions to accomplish the major gradations. It will thus be readily understood that the finer changes which determine the effectiveness of a printing operation are under the control, according to our invention, of very much more responsive and easily and accurately operated instrumentalities than those previously proposed.

Other objects, characteristics, and advantages will be apparent from the following portion of this specification, the attached drawings and the subjoined claims. For purposes of illustration only we are showing only certain preferred forms of our invention but it will be readily understood that we are in no way limiting ourselves to these particular exemplifications since changes may be made therein without departing from the spirit of our invention or the scope of our broader claims.

In the drawings:

Figure 1 is a diagrammatic view showing our invention applied directly to the control of resistance in circuit with a motor in accordance with the characteristics of the negative film to be reproduced or the negative film to be reversed into a positive, it being understood by those skilled in the art that the separate positive film which is illustrated will be omitted when the reversal process is used;

Figure 2 is a view similar to Figure 1 showing the control of the speed of the motor exercised by a film itself through a speed retarding winding applied to the fields of a motor;

Figure 3 corresponds to Figure 1 showing the control applied to a motor by means of a speed reducing brake;

Figure 4 is a diagrammatic view showing the operation of the invention by manual means;

Figure 4A is a fragmentary view corresponding to Figure 4, but showing an eye piece substituted for the photo-electric indicating device of Figure 4;

Figure 5 is a diagrammatic view showing the combination of mechanism for changing the speed of a motor and the use of light retarding screens;

Figure 6 shows such screens in the form of filters of the type which change the density of the beam without affecting the characteristics of wave lengths;

Figure 7 shows a form alternative to that of Figure 6 in which a portion of the light change is effectuated by wire mesh screens;

Figure 8 is a diagrammatic view showing our invention as applied to a reversal process;

Figure 9 shows a fixed heat and light absorbing screen applied to the printing light;

Figure 10 shows mechanism for operating light retarding screens such as those shown in Figure 6 or 7 in the form of the invention shown in Figure 5.

In carrying out our invention, we may pass a negative film 11 through a pilot gate 12 between a pilot light source 13 and a photo-electric cell or the like 14. In such cases as we are reversing a negative in order to form it into a positive, the pilot light 13 has non-actinic characteristics. The photo-electric cell 14 may be of any desired type, or of the photolytic type, or a heat responsive element such as a thermocouple. After passing through the pilot gate, the film is drawn through a printing gate 16 by means of a sprocket 17 and subjected to printing light from a source 18 which is maintained at a constant intensity. At this point, if our invention is applied to a printing process a positive film 19 may be introduced. It will be readily understood that the printing operation may be of the continuous or step type. The printing operation as such forms no part of the present invention, since the present invention lies in the field of the control of the printing operation and not the printing operation itself.

As previously explained, it will be understood that the amount of the exposure and consequently the density of the reversed or positive film is directly conditioned by the time of the exposure at an aperture 20. Consequently if the speed of operation of the sprocket 17 is increased, the exposure will be shorter and the resulting density less, while on the other hand if the speed of the drive of the sprocket 17 is diminished, the exposure will be longer and hence the resulting density greater. Such changes in speed of operation of the sprocket 17 we accomplish by changes in the speed of the motor M which through any conventional or desired connections, not shown, drives the sprocket 17.

As previously explained, the element 14, which is responsive to radiant energy in the form of either light or heat, is conditioned by the density of film through which light passes from the source 17. The light 13 may pass either through the negative image itself or, as clearly described in our parent case, it may pass through a series of signals placed upon the edge of the film and indicating the desired printing intensity.

The current proceeding from the element 14 is amplified by any desired or conventional means A to whatever extent may be convenient. This amplified current then proceeds through a lead 23 to a winding 24 which controls the movement of a core 25 pivoted at 26 and carrying a contact arm 27 which through leads 28 and 29 conveys current to the motor M. As the current passing through the windings 24 increases, the core 25 is attracted and moves the finger 27 over a resistance 30 connected in series with the motor against the power of a spring 31 thus increasing the speed of the motor M. Conversely when the amount of current amplified from the element 14 is decreased, the spring 31 moves the arm 27 in the opposite direction thereby increasing the amount of resistance in the motor circuit and increasing the speed of the film and consequently decreasing the printing effectiveness of the source 18.

In order to modify the speed of the motor more acurately than is possible with the resistance element above described, we may employ a mechanism such as is shown in Figure 2.

As before, a negative film 35 passes through a pilot gate 36 under the influence of a pilot light 37 which controls an element 38 responsive to radiant energy and then through a printing gate 40 under the power of a sprocket 41 past a constant printing light 42. The positive film 43 may be introduced at this point if desired and passed with the negative past a printing aperture 44.

The current proceeding from the element 38 is amplified by means A' and through a lead 47 passes through the winding 48 which controls the core 49 pivoted at 50 and carrying the contact arm 51 which cooperates with a variable resistance 52. A spring 53 tends to move the arm 51 against the attraction of the winding 48. The resistance 52 is in series with windings 55 in a shunt wound motor M'. As will be readily understood by those skilled in the electrical art, the current passing through the winding 55 sets up an electromotive force braking which tends to counteract the attraction of coils 56 and hence decreases the speed of operation of the motor M'. Thus an increase in the current passing through the winding 54 decreases the speed of the motor and shortens the exposure and vice versa. It will be therefore understood that the amount of light to which the film 35 or 43 is subjected varies inversely as the light to which the pilot element 38 is subjected.

Figure 3 shows another modification of our invention in which the speed of the motor M' is controlled by a brake member of the pump type, recognized as extremely accurate.

A negative film 61 may be moved through a pilot gate 62 under the influence of a pilot light 63 which controls a light or radiative-responsive element 64. Movement of the film through a printing gate 65 under the influence of a constant printing light 66 is carried out by a sprocket 67 which is operated by the motor M".

The current proceeding from the control element 64 is amplified as at A" and passes through a winding 68 which controls a core 69 which is pivoted for movement with a gear 70 meshing with a gear 71 and operates the bar 72 through teeth cut in one end thereof, the other end being formed as a needle 73. A spring 74 attached to an arm 74' which moves with the core 69 moves the core and the parts assembled therewith to the left as viewed in Figure 3. The portion of the needle 73 controls the amount of oil 75 which the gears 76 pump through the openings 77 and 78. The other, or leftward end of the member 73 is attached to the linkage 71 so that upon the movement of the core 69 to the left as viewed in Figure 3, the support 73 and the needle 74 likewise move to the left, thereby increasing the opening through which the oil passes. It will be readily understood that the speed of operation of the gears 76 is directly proportioned to the size of the opening which in turn is determined by the position of the needle 74. A relief valve 79 is provided to take care of temporarily over great pressure. The gears 76 are directly connected to the motor M" and in the line of drive to the sprocket 65. This drive may include any desired or conventional motion transmitting members. It will thus be understood that the speed of operation of the sprocket 65 is accurately controlled by the position of the needle 74, this position, in turn, being controlled by the density of the film.

In the above portion of this specification, it is assumed that the photo-electric cells 14, 38 and 64 are of the type in which an increase in the light impinging thereupon increases their electrical effectiveness. If cells of the opposite type are used, in which an increase in light causes a decrease in electrical efficiency, the lead between the motors M and M' and the resistance 30 and 52 respectively will be placed at the other ends thereof, and the linkage 71 of Figure 3 will be modified so that the movement of the core 69 will move the needle 74 in the opposite direction.

As is shown in Figures 4 and 4A, we may operate our invention in part manually. A negative film 81 may pass through a signalling gate 82 with an aperture through which a signal light 83 passes a beam which impinges upon a photoelectric cell 84, the current from which is amplified in well known desired way as indicated at 85. Such amplified current passes through a winding 86 which operates a pivoted core 87. Attached to this core is a pointer 88 which is moved in one direction by the strength of the attraction exerted upon the core by the winding and moved in the other direction by a spring 89. The end of the pointer cooperates with markings 90 which indicate the density of the negative.

A printing light 91 projects a beam upon a printing gate 92 through which, if desired, a positive film 93 may also be passed. The negative film and the positive film, if employed, are both fed by a sprocket 94 which is driven through any desired connection (not shown) by a motor 95. A series of screens 96, each provided with a handle 97 are mounted for movement from and to positions wherein they intercept the beam of light passing from the source 91 to the printing gate 92. As the operator wishes to make a major change in the intensity of the printing light, he manually moves one or more of these screens as desired. A variable resistance 98 is arranged for inclusion in the circuit of the motor 95 by means of a wiper arm 99 operated by a handle 100. To effectuate the desired minor changes in the intensity of the printing light, the operator moves the handle 100 thereby decreasing or increasing the resistance in circuit with the motor and hence the time of exposure and the effectiveness of the printing light.

Figure 4A shows an alternative arrangement in which a pilot light source 102 illuminates a ground glass or similar material 103 and a sighting aperture 104 through which the operator views the negative film 81' as it passes by, and changes the printing intensity. In accordance with his judgment, he operates the screens 96 and the resistance 98.

The two forms of our invention shown above are particularly applicable when a negative is to be reversed into a positive and pre-timing is not practicable. It may be used however, for a printing operation and is particularly useful in the quick making of rough first prints or "rushes."

It will be readily understood that since printing operations require great changes in effective printing light that if speed of operation of the film is the only factor upon which reliance is placed the differences will be so great that either an undue amount of time will be required to print a dense film or the film moved too rapidly to print a light film. Consequently, we may supplement control of the printing effectiveness by means of changes in motor speed by adding filters of uniform density which accomplish the larger changes in printing effectiveness and rely upon the change in motor speed for the finer gradations, all as described immediately hereinafter and shown in Figures 5, 6, 7 and 10.

We secure the relatively large gradations of light by means of the interposition of a series of screens of uniform density and the minor variations by changes in the speed of film movement. The accuracy, elasticity and efficiency of such operations are apparent.

Figure 5 shows diagrammatically a preferred form of our invention, in which the operation is entirely automatic, and the gradations are secured as above. In carrying out this form of our invention, we may pass a negative film 111 through a pilot gate 112 past a pilot light source 113 and a photo-electric cell 114, the pilot light 113 having non-actinic characteristics if our invention is applied to a reversal operation. In place of the photo-electric cell 114 we may use photolytic material or a thermo-couple. The film is then drawn through a printing gate 116 by a sprocket 117 and subjected to a printing light from a source 118 which is maintained at constant intensity. At this point, if our invention is applied to a printing instead of a reversal process, a positive film 119 may be introduced. The current proceeding from the element 114 is amplified in any desired or conventional apparatus generally indicated at 121. The amplified current then proceeds through a lead 123 to a first of a succession of closely interrelated controlling units each representing one stage of obscuration. It will be assumed that the operation of the apparatus is started at the point in which the desired intensity of the printing light is as great as possible so that thereafter a maximum amount of obscuration is introduced into the effective printing light. At this point, the negative being of maximum density, a minimum amount of light is passing therethrough and impinging upon the cell 114. The motor is at its slowest speed, and all screens are out of light intercepting positions. The amplified current from the lead 123 passes through a winding 124 which controls the movement of a core pivoted at 126 and carrying a wiper and switching arm 127 which operates a resistance 130 in circuit with the motor M'''. As previously explained, an increase in the effectiveness of the amplified current will move the wiper arm 127 to the right as viewed in Figure 5 against the power of a spring 131, thus placing less of the resistance 130 in circuit with the motor M''', while a lessening of this current will permit the spring 131 to move the arm 127 to the left and thus decrease the amount of current passing through the resistance to the motor. Thus the movement of the arm 127 to the right increases the motor speed and decreases the exposure, while movement to the left decreases the motor speed and increases the exposure. If the current passing through the lead 123 is sufficient to move the arm 127 the entire distance to the right, a switch block 132 supported thereupon and insulated therefrom contacts with switch points 133 thus closing a circuit to a solenoid 134 which thereupon moves a switch arm 135 downwardly as viewed in Figure 5, thus breaking the previous circuit through the winding 124 and making a circuit through a lead 137 which operates a solenoid 138 to pull a switch arm 139 upwardly, as viewed in Figure 5, from its previous neutral position, thus closing a circuit through a winding 140 and permitting the amplified current to pass therethrough. The operation of the solenoid 134 will also be effective, as clearly shown in Figure 10, to move a screen 141 into light intercepting position and thus place the apparatus fully in the second stage of obscuration. Solenoids 134 and 142 are joined by a shaft 143 to which an arm 144 operating a link 145 is applied. A link 146 pivoted at 147 through a pin and slot connection 148 operates the screen 141. The actuation of the solenoid 134 moves the screen 141 from the full line or non-shielding position to the dotted line or shielding position of Figure 10, while the actuation of the solenoid 142 will be effective to move the screen 146 from the dotted line to the full line position. The utility of the pin and slot connection will later be apparent in connection with later stages hereinbelow described. It is not necessary for the first and last stages, but as a matter of manufacturing practice we may prefer to make all connecting mechanism alike.

It will be readily understood that when the circuit through the winding 124 and the switch arm 135 is broken, the spring 131 will snap the arm 127 back to the neutral position.

It will be noted that as the switch arm 139 moves upwardly to close a circuit including the winding 140, it first impinges upon an elongated contact 149 which closes a circuit through the winding 140 before it energizes a lead 150, thus moving a core 151, which is pivoted at 152, and a contact and switch arm 153 mounted thereupon to the right before a switch member 154 mounted on the switch arm 153 can become effective to energize two circuits, including one leading to the solenoid 142, which are controlled thereby. Increase of the amplified current through the winding 140 will be effective, as previously described, to move the arm 153 to the right over a resistance 157, thus increasing the speed of the motor M''' and decreasing the effectiveness of the printing light. When this signalling current becomes sufficiently great to move the arm 153 completely to the right as viewed in Figure 5, switch points 160 will be effective to close a circuit which through appropriate leads operates both parts 161 and 162 of a solenoid which is opposed to the solenoid 138. Such operation will be effective to move the switch arm 139 downwardly so that it breaks the circuit through the winding 140 and makes a circuit through a lead 165. To move the switch bar 139 clear of the elongated contact 149 after the circuit through the winding 140 is broken, a simple toggle is applied which is an exact duplicate, except in the length and power of its spring 165' of the toggle later described in connection with the switch bar 168. The power and length of the spring 165' are merely sufficient to move the switch bar 139 to the neutral positions as shown in full line. This operation of the solenoid windings 161—162 also moves a screen 164 into light obscuring position, through connections similar to those described for the screen 141. This lead 165 directly corresponds to the lead 137 previously described, and operates another stage of obscuration through mechanism which is an exact counterpart of that which has just been described. Any number of such stages, each with identical mechanism, may be interposed between the second and final mechanisms above and later described respectively. In order to save space, since each of these mechanisms is identical with the others, description and illustration of them is omitted.

The lead corresponding to 165 in next to the final stage of obscuration is attached to a lead 166 which operates a solenoid 167 to draw a switch arm 168 upwardly as viewed in Figure 5 to complete a circuit from the lead 123 through a winding 169 and at the same time breaks a circuit through the previous winding last previous in the line of succession, that is to say, the winding corresponding to 148 described above. As in the previously described unit an elongated contact point 169' is supplied. The winding 169 operates a core 170 pivoted at 172 and operating a switch and contact arm 173 in the manner previously described.

After the contact arm 173 is moved by a spring 174 completely to the left, owing to a decrease in the intensity of the signalling light, the reverse movement through the several stages of obscuration takes place. A switch block 176 mounted upon the arm 173 and insulated therefrom through a lead 177 operates a solenoid 178 to break a circuit through the winding 169, and operates a lead 179 which is connected to a lead corresponding to a lead 179' in the control unit adjacent that which operates the final stage. In order to move the switch arm completely off the elongated switch point 169' controlling the winding 169, a simple toggle is applied. This toggle comprises a rod 168a pivotally attached to the arm 168 and working in a guiding opening in a member 168b pivoted upon a base. A relatively weak spring 168c working between the member 168b and a collar 168d quickly moves the switch arm 168 to the full line position after the first portion of the movement of the solenoid 178. Thereupon, the circuit to this solenoid is broken. The corresponding lead in the control unit adjacent the one shown in the drawings as intermediate the first and last in the line operates the solenoid 138 which removes the screen 164 from operative position and closes the switch 138—148 and sets the toggle, thus again placing the arm 153 in operation for as long a period as may be signalled. When the signalling current passing through the lead 123 and switch arm 138 becomes diminished to a predetermined point, it moves the arm 153 completely to the left as viewed in Figure 5, thus through the switch block 154 mounted upon and insulated from the arm 153 closing a lead 181 which operates only one of the windings 182 of the double-wound solenoid previously described, thus with the aid of the previously described toggle pulling the switch bar 138 to a neutral position. Owing to the pin and slot connection previously described, this movement has no effect upon the screen 164, which has previously been removed from light obscuring position. The switch block 154, through a lead 182 likewise operates the solenoid 142 which moves the switch bar 135 into such position that the control current again passes through the winding 124. The operation of the solenoid 142 also removes the screen 141 from effective relation to the film.

In the above description of our invention it has been assumed that the progression of the changes in intensity will be regular from one stage to another, and then back again. It is of course understood that as a matter of fact these changes will be irregular and will go from one stage to another in either direction or may fluctuate within one stage for a long period.

As shown in Figure 6, the several light obscuring elements 141 and 164 and those intervening are formed of a material of uniform density which changes the amount of light which passes therethrough without changing its rate of vibration. Such filters are commonly made of ground glass or are gray in tone. In Figure 7, as a preferred modification, we show filters 141' and 164' and those intervening which are composed of metallic mesh of varying degrees of fineness. The advantages of such light retarding means include a large reduction in the heat which passes from the light source to the film without any change in printing effectiveness. This reduction is particularly important in such cases as those in which our invention is applied to the reversal of a negative to a positive. In this process the negative is handled wet, or at least moist, and the ill effects of undue heat from the printing light source are more marked than with a dry film.

Alternatively to such movable screens, diaphragms may be employed and controlled similarly.

Figure 9 shows a printing light source 118' with a metallic mesh screen 190 permanently in the light beam in order to reduce the heat at all stages. Any other heat reducing medium may be employed. In addition, the screens described above, if desired, may be employed. The advantage of this plan is that it permits a light source of higher intensity to be used, and then filters out a certain amount of the heat without changing the light characteristics. Such a light source burned below its full intensity is not so likely to fluctuate with minor voltage variations, lasts much longer, and well lends itself to control by means of changes in the resistance in its circuit, as described above, since changes in intensity can be effectuated without changing color values, as is not possible with an incandescent light source burned to a critical intensity.

In any form of our invention in case the pilot or signalling aperture is placed for convenience a considerable distance from the printing aperture, any suitable time-conserving electrical element or relay may be placed at any convenient point in the circuits controlled by the current passing from the signalling cell so that the changes in intensity at the printing aperture are properly timed.

As previously pointed out, our invention in all of its several aspects may be applied equally well either to a printing process in which a positive is reproduced from a negative, or to a reversal process in which a negative is changed into a positive. Figure 8 shows the invention applied to a reversal process. A negative film 193 in process of reversal is fed through a pilot gate 112 and under the influence of a non-actinic pilot light 113' which operates a cell or a thermo-couple 114' and through a printing gate 116' in which a printing light 118'' through an aperture 120' reexposes the negative so that a positive ultimately results.

Many of the characteristics, objects and advantages of our invention will be evident from the drawings which are a part hereof and from a portion of the foregoing portion of this specification. These advantages include the provision of a simple method whereby intensity of a printing or reversal light may be controlled either manually or automatically, preferably through several stages, one instrumentality establishing the major gradation of each stage and another instrumentality determining the finer gradations within each stage. Other advantages flow from the provision of an automatic printing control whereby electrical resistance is used to vary the effectiveness of the printing or reversal light by varying the speed of the motor. Still other advantages flow from the provision of method and apparatus whereby a photo-electric control or the like automatically operates the effective intensity of the printing or reversal light.

We claim:

1. The method of producing a motion picture film bearing successive positive images of uniform density from successive negative images of non-uniform density which comprises moving a film bearing negative images past a light source, materially changing the amount of light from said source which reaches the film thereby securing the desired major gradations in the photographic effectiveness of such printing light, and simultaneously slightly varying the speed of film movement thereby securing the desired minor gradations in such photographic effectiveness.

2. The method of producing a motion picture film bearing successive positive images of uniform density from negative images of non-uniform density which comprises moving a film bearing successive negative images past a light source, photo-electrically determining the differences in the density of said negative images, materially changing the amount of light from said source which reaches the film in accordance with such photo-electrical determinations, thereby securing major gradations in the photographic effectiveness of such printing light, and likewise in accordance with such photo-electrical determinations slightly simultaneously varying the speed of film movement thereby securing minor gradations in such photographic effectiveness.

3. In a motion picture printing operation, the method of changing the effectiveness of the light which is employed to produce a series of positive images of uniform density from a series of negative images of non-uniform density which comprises moving a film which is to bear said positive images past a light source which is maintained at uniform brilliance, determining the density of the negative images, in accordance with such determinations interposing each of a series of light retarding screens between the light source and the film, each of said screens being of uniform density but of density markedly different from that of each of the other of the screens, removing each of said screens when another thereof is placed in line with the light, and varying the speed of travel of the film past the light source in accordance with such determinations while the light reaching the film from the light source is influenced by said screen.

4. In a motion picture film printer, a source of light, means for feeding a film bearing successive negative images through light from said source, means for driving said feeding means, a brake for said driving means, means for applying said brake in accurately determined gradations, control means responsive to changes in the density of said successive negative images, and an operative interconnection between said control means and said brake applying means for operating said brake applying means in accordance with the density of said images.

5. In a motion picture film printer, a light source, means for feeding a film bearing successive negative images through light from said source, a shunt wound motor for driving said feeding means, a resistance winding in said motor for decreasing its speed, means for varying the current passing through said resistance winding, control means responsive to changes in the density of said successive negative images, and an operative interconnection between said density responsive means and said current varying means for controlling said resistance and hence the speed of said motor in accordance with the density of said images.

6. In a motion picture film printer, a light source, means for feeding a film bearing successive negative images through light from said source, means for driving said feeding means, a fluid brake for said driving means, control means responsive to the density of said successive images, and an operating connection between said density-responsive means and said fluid brake for operating said fluid brake in accordance with the density of said images.

7. In a film handling apparatus, a member for feeding a film, a motor for driving said feeding member, a plurality of gears interposed between said motor and said member for transmitting the power of said motor to said member, two of said gears in operative relation to each other being disposed in a relatively small chamber in a wall of which an opening is formed, a reservoir for a fluid, said opening communicating with said reservoir and said reservoir chamber and opening being so disposed that said fluid will flow between said reservoir and said chamber under the influence of said meshing gears when they are revolved by said motor, and means for closely controlling the size of said opening and hence the speed of movement of said fluid whereby the speed of said motor is closely controlled.

8. In a motion picture film printer, a source of light, means for feeding a film bearing successive negative images through light from said source, means for changing the speed of said feeding means whereby the photographic effectiveness of said printing light is changed, means separate from said speed changing means for reducing the brilliance of light from said source as it impinges upon the film, and control means operatively interconnecting said speed changing means and said light modifying means for operating one thereof as supplemental to and concomitant with the operation of the other thereof.

9. In a motion picture film printer, a source of printing light, means for feeding a film bearing successive negative images of varying degrees of density through light from said source, a series of light modifying instrumentalities successively movable into the path of said printing light, means for moving said light modifying instrumentalities into the path of said light, means for changing the speed of said feeding means while each of said instrumentalities is in effective relation to said path of light, and control means operatively interconnecting said moving means and said speed changing means for concomitantly operating each of said means whereby the modification of light from said source and the change in speed of movement of the film therethrough are jointly controlled.

10. In a motion picture film printer, a source of light, means for moving a film bearing successive negative images of varying degrees of density through light from said source, means for changing the speed of said feeding means, a plurality of means for differently modifying the brilliance of said light as it impinges upon the film, operating means for successively and separately rendering each of said modifying means effective and then ineffective upon said light, control mechanism operatively interconnecting said operating means and said speed changing means for concomitantly actuating each of said means, and means operated by changes in the amount of light passing through said images of varying density for actuating said control mechanism.

11. In a motion picture film printer, a source of light, means for moving a film bearing successive negative images through light from said source, means for changing the speed of said feeding means, means other than said speed changing means for modifying the brilliance of said light as it impinges upon the film, control means responsive to the density of said successive images, and means operatively interconnecting said density-responsive means, said light modifying means, and said speed changing means for concomitantly operating said light modifying means and said speed changing means in accordance with variations in density of said successive images.

12. In a motion picture film printer, a source of light, means for feeding a film bearing successive negative images through light from said source, means for changing the speed of said feeding means, means other than said speed changing means for modifying the light impinging upon the film, and means actuated by said speed changing means for concomitantly operating said light modifying means.

13. In a motion picture film printer, a source of light, means for feeding a film bearing successive negative images through light from said source, means for changing the speed of said feeding means, means for modifying the light impinging upon the film, and means actuated by said light modifying means for controlling said speed changing means.

14. In a motion picture film printer, a source of printing light, means for feeding a film bearing successive negative images of varying density through light from said source, means for changing the speed of said feeding means, an instrumentality movable into and out of the path of light from said source for modifying the effectiveness of the light, means for moving said instrumentality, and control means for said speed changing means operated by the movement of said moving means.

15. In a motion picture film printer, a source of printing light, means for feeding a film bearing successive negative images of varying degrees of density through light from said source, means for changing the speed of movement of said feeding means, said speed changing means including a movable actuating member, a light-modifying instrumentality movable into and out of the path of said printing light, magnetic means including a circuit for moving said instrumentality, a switch for controlling said circuit operated by said movable actuating member, and means for moving said movable actuating member.

16. In a motion picture film printer, a source of printing light, means for feeding a film bearing successive negative images of varying density through light from said source, means for changing the speed of said feeding means, an instrumentality movable into and out of the path of light from said source for modifying the effectiveness of the light, means for moving said instrumentality, a circuit for operating said speed changing means, means controlled by variations in the density of said successive images for feeding said circuit thereby operating said speed changing means, and a switch for said circuit operated by the movement of said moving means.

17. In a motion picture film printer, a light source, means for feeding a film bearing successive negative images through light from said source, means for variably changing the speed of said film feeding means whereby the photographic effectiveness of light from said source is changed, said speed changing means being operable within a predetermined range, means for operating said speed changing means, means other than said speed changing means for changing the amount of light impinging upon the film, and an operative interconnection between said speed changing means and said light modifying means for operating said light modifying means at an extreme point in the range of operation of said speed changing means.

18. In a motion picture film printer, a source of printing light, mechanism for feeding a film bearing successive negative images of varying density through light from said source, a plurality of instrumentalities successively movable into and out of the path of light from said source, each of said instrumentalities being effective materially to modify the effectiveness of said printing light and representing a distinct stage of light intensity, separate means for selectively and successively moving each of said instrumentalities into the path of said light, means associated with each of said light modifying instrumentalities for gradually changing the speed of said feeding mechanism while each of said instrumentalities is in effective relation to the light thereby relatively slightly modifying the effectiveness of the printing light, said speed changing means having a predetermined range of movement, control mechanism operated by said moving means in a first of said stages for placing the moving means applying to a second of said stages in such condition that it can be operated, and means operated by the speed changing means associated with said moving means of said first stage for rendering the moving means of said second stage operable when said speed changing means reaches an extreme in its range of movement.

19. In a motion picture apparatus, a film feeding member, a source of light directed upon a film fed by said member, a screen movable from and to a position wherein it modifies the light reaching the film from said source, electrical means having a circuit for moving said screen in relation to said light, a motor for driving said feeding means, resistance connectible in the circuit of said motor for changing the speed thereof, a wiper arm for operating said resistance, and a switch for the circuit of said moving means movable with said wiper arm for operating said moving means in accordance with the speed of said motor.

WARREN DUNHAM FOSTER.
PEOPLES-PITTSBURGH TRUST
COMPANY,
*Executor of the last Will and Testament of Earle L. Parmelee, Deceased,*
By GWILYM A. PRICE,
*Trust Officer.*